Dec. 10, 1957  C. C. ALBRECHT ET AL  2,815,647
VARIABLE SPEED HYDRAULIC TRANSMISSION
Filed Sept. 9, 1955  3 Sheets-Sheet 1

*INVENTOR.*
CLIFFORD C. ALBRECHT
HOWARD G. BROWN
BY
Chapin + Neal
ATTORNEYS

Dec. 10, 1957 C. C. ALBRECHT ET AL 2,815,647
VARIABLE SPEED HYDRAULIC TRANSMISSION
Filed Sept. 9, 1955 3 Sheets-Sheet 2

*INVENTOR.*
CLIFFORD C. ALBRECHT
HOWARD G. BROWN
BY
*Chapin & Neal*
ATTORNEYS

Dec. 10, 1957  C. C. ALBRECHT ET AL  2,815,647
VARIABLE SPEED HYDRAULIC TRANSMISSION
Filed Sept. 9, 1955  3 Sheets-Sheet 3

*INVENTOR.*
CLIFFORD C. ALBRECHT
HOWARD G. BROWN
BY
Chapin + Neal
ATTORNEYS

United States Patent Office 2,815,647
Patented Dec. 10, 1957

2,815,647

VARIABLE SPEED HYDRAULIC TRANSMISSION

Clifford C. Albrecht, Leicester, and Howard G. Brown, Worcester, Mass., assignors to Novelty Tool Co., Inc., Spencer, Mass., a corporation of Massachusetts Application September 9, 1955, Serial No. 533,292

9 Claims. (Cl. 60—53)

This invention relates to a variable speed hydraulic transmission and has for a particular object to provide a variable speed hydraulic drive of compact construction utilizing a sliding vane type of rotary pump for the driver and a similar type of pump structure for the driven motor.

Another object of the invention is to provide a variable speed drive which will be adapted to handle slow speeds surely and steadily and without the necessity of providing gearing therefor.

A further object is to provide a small compact variable speed drive which may be mounted as an attachment on existing machinery and which can be provided as accessory equipment where conveniently desired.

Yet another object is to provide a variable speed drive of a small size and novel mechanism for readily and easily adjusting the unit for different speeds.

The invention resides in the particular combination and relationship of the parts of the unit utilizing as the motor thereof a rotary pump form of assembly having the outer eccentric casing member as the driven element with the sliding vane inner member as the stationary element, and further in the relation of the parts of the unit comprising the variable speed regulating mechanism which varies the eccentricity of the pump casing, the latter defining the chamber in which the vaned pump rotor operates.

The above and further specific objects and advantages of the invention will be apparent from the following description thereof in connection with the accompanying drawings, in which Fig. 1 is a transverse sectional view of a unit embodying the invention;

Figure 1:
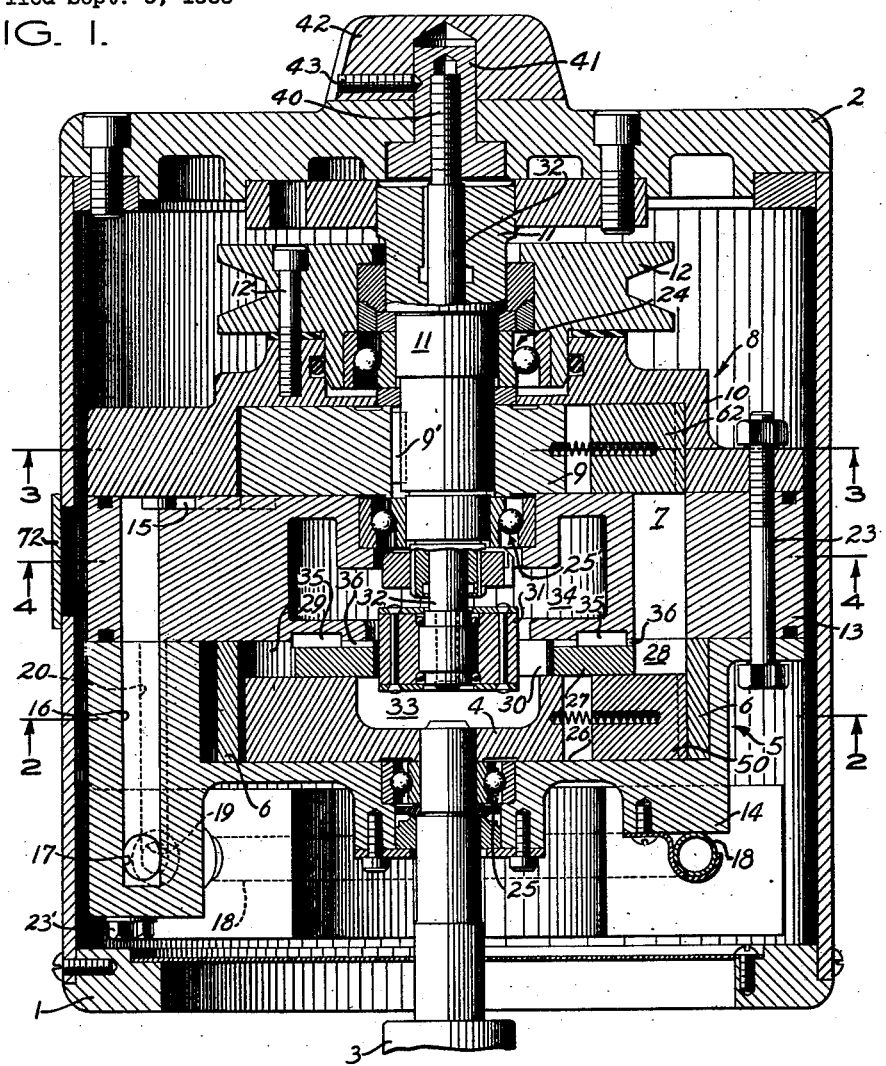

Referring to Fig. 1 the operating unit may be mounted in an outer casing enclosure having end walls 1 and 2. A drive shaft 3 extends inwardly of the end wall 1 being driven from any suitable source of power. To the inner end of the shaft 3 is fixed a sliding vane rotor or inner member 4 of a rotary pump generally designated by the numeral 5. The pump 5 is a variable capacity rotary pump of the sliding vane type having an outer cup-shaped pump chamber defining member or speed control housing member as the cam ring 6 adjustable from a position of concentricity to a position of eccentricity with respect to the rotor as will be later described. The high-pressure output passage of the pump may be seen at 7 leading to the inlet side of a motor generally designated by the numeral 8. As will be later more specifically described the motor is provided with a stationary inner element 9 with sliding vanes and a rotatable outer housing member 10. The element 9 is supported on a stationary shaft 11 fixed to the end wall 2. At 9' is a key, non-rotatably fixing element 9 on the shaft 11.

The driven housing member 10 carries at its outer side an output sheave 12 fixed to it for the power take-off means of the unit. Fixed rigidly to member 10 at its inner side is an intermediate chambered reservoir member 13 to which a housing member 14 enclosing the pump assembly 5 is also rigidly fixed. Thus the sheave and housing members 10, 13, and 14 rotate together.

Figure 5:
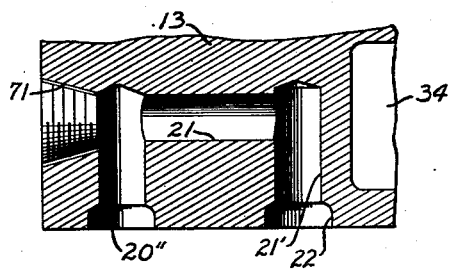
Fig. 5 is a fragmentary detail view on line 5—5 of Fig. 4 showing fluid return passages.

The high pressure delivery side of the pump at 7 is through member 13 to the input side of the housing 10 of motor 8. The return side of the pump is connected to a passage 15 at the opposite side of member 13 (Fig. 1) conducting the return line radially to a passage 16 leading to the port 17 of a cooling tube 18 bracketed on the end of member 14. An outlet port at 19 of the tube 18 leads through a return passage 20 (Fig. 2) parallel to passage 16 and as will be later described to a radial branch 21 (Fig. 5) in member 13 and thence to a port 22 communicating with the low pressure side of the chamber of pump 5. A closed hydraulic circuit is thus established between the pump 5 and motor 8.

Figure 2:
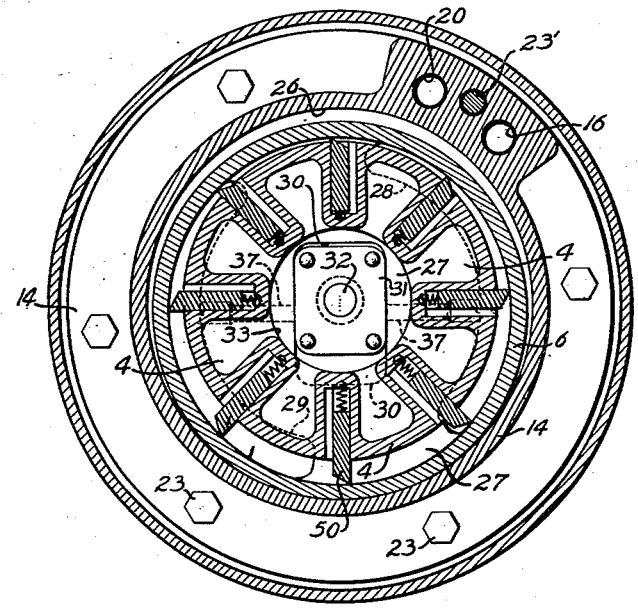
Fig. 2 is a section substantially on line 2—2 of Fig. 1 showing the pump mechanism.

It will be noted that the housing members 10, 13, and 14 are in fixed relation (by bolts at 23 and a screw at 23' through the tube overhanging of housing 14, Figs. 1 and 2) for rotation thereof as a unit together with the sheave 12 (fixed to member 10 as by screws indicated at 12'). The ball bearing assembly at 24 carries the motor end of the rotatable housing unit for rotation about shaft 11 and the bearing assembly 25 carries the pump end of the unit for rotation relative to shaft 3. The bearing at 25' on the shaft 11 directly supports the housing 13 as shown.

Thus when the rotor 4 of pump 5 is driven with the cam ring member 6 eccentrically positioned the delivery of fluid, as oil, under pressure to the motor causes the entire housing assembly to rotate, driving sheave 12 and by means of a belt drive (not shown) any mechanism to which the variable speed drive unit may be linked.

The speed of the unit is governed by the degree of eccentricity to which the cam ring member 6 is moved with respect to rotor 4. The housing 14 of pump 5 is formed as shown by Fig. 1 with a recess 26 having a cylindrical wall in which the rotor 4 is positioned and into which the flanged cylindrical wall of the cup-shaped cam ring member 6 is projected. As shown by the spacing at the left hand side of member 6 in Fig. 1 the cylindrical flange of member 6 is of a smaller diameter than that of the recess 26 of member 14. At the outer side of the recess 26 in housing 14 the side wall or disc portion 27 of member 6 is disposed. In this portion adjacent the flange and in diametrically opposed positions are formed the outlet port 28 and the return port 29 of the pump. It will be noted from the dotted line showing as in Fig. 2 (and in Fig. 6) that both ports 28 and 29 of member 6 are passages formed as elongated arcuate slots.

Figure 3:
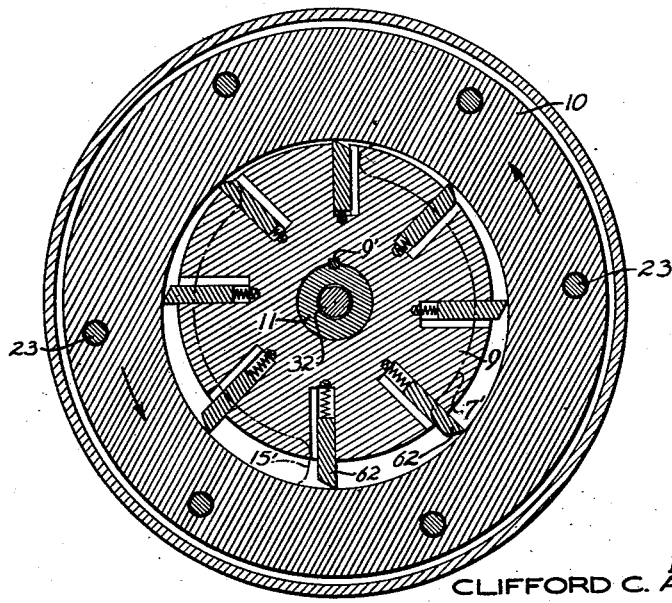
Fig. 3 is a section substantially on line 3—3 of Fig. 1 showing the motor unit.
Figure 4:
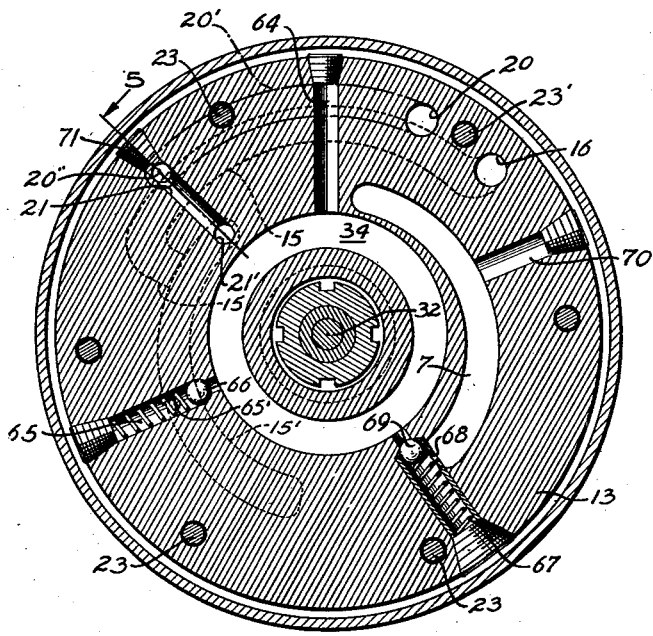
Fig. 4 is a section substantially on line 4—4 of Fig. 1 showing detail of the intermediate reservoir housing between the pump and motor.

The high pressure output passage 28 from the pump is aligned with the passage shown at 7 (Fig. 1) of member 13. As shown by Figs. 1 and 4 the passage 7 is an elongated arcuately disposed slot cut entirely through member 13. Slot 7 is in communication with the chamber of the motor member 10 and defines the high pressure inlet side thereof. In Fig. 3 the high pressure side of the motor has been indicated by the dot-dash arcuate area at 7'.

The low pressure side of the motor is also defined by an arcuately slotted area indicated in Fig. 3 at 15'. This low pressure side of the motor unit, is formed by the arcuately cut groove 15 disposed in the adjacent side wall of member 13 as shown by Fig. 4. The groove 15' at the far side of member 13 as viewed in Fig. 4 is in communication with groove 15 directed at its inner end radially and outwardly from the upper end of groove 15' and thence arcuately to connect with the passage 16 (see also Fig. 1). Passage 16 as shown by Fig. 1 extends parallel to the turning axis of the unit through housing members 13 and 14, to the cooling tube 18.

From the outlet 19 of the tube and passage 20 of the housing 14 (Fig. 4) the return line leads to the adjacent face of housing 13 in which an arcuate connecting groove is cut. In Fig. 4 the path of this groove is indicated by the dot-dash lines at 20' connecting passage 20 with passage 20''. The latter passage at 20'' (Fig. 4 and Fig. 5) is the entrance to the U-shaped conduit of housing 13 having radial passage 21 and reversed exit leg 21' to the port 22 at the return side of the pump 5. Port 22 is itself an arcuate groove cut in the face of housing 13 adjacent pump housing 14 for matching with the arcuate slot 29 of the movable pump cam ring member 6 (see Figs. 2 and 6). The approximate boundaries of the grooved port 22 (see Fig. 4) on the pump side face of housing 13 may be seen from the boundaries of the groove 15' on the opposite or motor face of the housing as seen in Fig. 4. The two grooves 15' and 22 correspond in positioning and dimensions.

Figure 6:
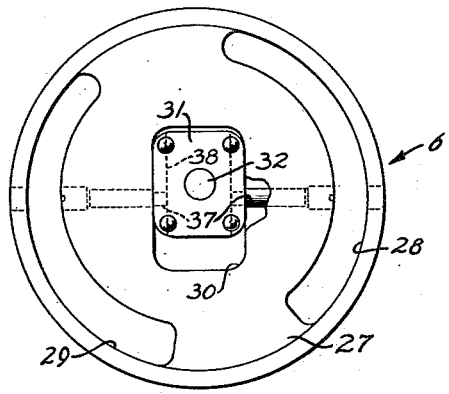
Fig. 6 is a detail view showing the actuating mechanism for varying pump output pressure with the pump chamber member or speed control housing of the pump connected to the actuator block.

The mechanism for changing the eccentricity of the pump and speed of the unit will now be described. In Figs. 1 and 6 it will be noted that the cam ring member 6 is formed with a central rectangular opening at 30 between the sides of which a bearing block 31 is supported for rotation on the end of a stem 32 slidably mounted in stationary shaft 11 (Fig. 1). The bearing block is for adjusting the eccentricity of member 6 in the recess 26 with respect to the pump rotor 4. It will also be noted that rotor 4 is circularly recessed centrally at 33 to provide for movement of the block 31 toward and away from the same. In the intermediate member 13 a chamber 34 also receives the block at the other side of opening 30.

The disc 27 of member 6 is keyed to the adjacent wall of member 13 for slidable movement transversely thereof as indicated by the keys 35 and ways 36. Because of the keys the member 6 thus also rotates at the driven speed of the assembly of the housing members 10, 13, and 14.

Figure 7:
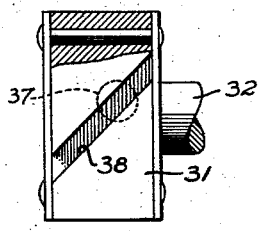
Fig. 7 is a side elevational view of the actuator element shown in Fig. 6.

In order to move the member 6 transversely of the axis of the rotor a pair of diametrically opposed pins 37 (see Fig. 6) are radially fixed in the disc 27 and project at their spaced inner ends into the central opening 30 from opposite sides thereof. The pins are received in grooves 38 formed in opposite faces of the bearing block 31 (see Fig. 7). Grooves 38 as shown are diagonally directed across the faces transversely of the axis of the stem 32 on which the block is rotatably mounted as shown by Fig. 1. Accordingly, the axial movement of the block toward and away from the rotor 4 will cause the grooves 38 to cam pins 37 riding in the grooves and thus raise and lower member 6 transversely of the axis of the rotor. Thus the eccentricity of the member 6 may be adjusted with respect to the rotor and the output of the pump may be varied. In Fig. 2 it will be noted that the bearing block is shown adjacent the top of the opening 30 and thus a relatively greater degree of eccentricity is obtained in the position shown. It will be realized the cam ring member 6 may be raised from the position as shown in this view to a concentric position relative to the rotor and in such case the pump will be ineffective to transmit pressure and power to the motor 8. The maximum degree of eccentricity would be obtained with the bearing block at the extreme upper end of the opening 30.

For movement of the block 31 the stem 32 is slidably mounted in shaft 11 and provided with an outer threaded end 40 turned into the socket of a flanged adjusting member 41 seated in end wall 2. At the outer end of member 41 a manual adjusting knob 42 is fixed by set screw 43 to the member 41. Thus by turning the knob 42 the stem 32 may be moved longitudinally of the shaft 11 by reason of the threaded connection at 40 in member 41. Movement of the stem thus may govern the speed at which the unit is driven.

In Fig. 2 the eccentric relation of member 6 to the rotor is best shown, the rotor 4 having a plurality of spring loaded sliding vanes 50 formed in conventional manner to bear against the cylindrical wall of member 6. The operation of this type of hydraulic pump is well known.

In Fig. 3 the motor assembly is best seen with the spring loaded blades or sliding vanes 62 of the member 9 also of a conventional design, the outer bladed ends bearing against the cylindrical chamber wall of the housing 10.

The degree of eccentricity between the rotatable motor housing 10 and the stationary vaned member 9 is fixed as may be desired in a particular unit. In operation when the oil is under high pressure at the inlet passage 7 (under influence of the operation of pump 5) the pressure is exerted in the spacing between blades 62 adjacent the arcuate port indicated at 7'. Inasmuch as the high pressure oil cannot move the stationary inner member 9 fixed to the stationary shaft 11, the outer member, housing 10, must move.

It will be noted from Fig. 3 that the position of the inlet port or high pressure side at 7' of the motor is fixed for counterclockwise movement. The spacing between the inner stator element 9 and rotatable housing 10 along the arc of port 7' is greater at its trailing end than at the leading end. The pressure of oil filling this area at any rotative position of the housing with respect to element 9 tends to turn the latter clockwise by reason of the greater blade area at the trailing end. Since element 9 is stationary the pressure is effective to propel the housing in a counterclockwise path of rotation. The annular spacing between adjacent ends of the inlet area 7' and outlet area at 15' may be noted as slightly greater than the spacing between two adjacent vanes 62.

An oil reservoir is formed in housing 13 of the unit by the chamber 34 to which is joined the recess 33 of rotor 4 through opening 30 (Fig. 1). As best shown by Fig. 4 a plugged fill passage 64 is provided leading from the outer wall of housing 13 to chamber 34. From the chamber 34 a radial outlet passage is shown at 65, the restricted port therebetween being normally closed by a spring loaded ball valve 66. The outlet 65 communicates with the groove 15' by a connecting passage at 65' for feeding into the low pressure side of the circuit.

An outlet to the high pressure side is provided by the radial passage at 67 which leads into high pressure slot 7 through a port at 68. The spring loaded ball 69 closes off the restricted inlet to passage 67 from chamber 34.

The high pressure and low pressure sides may also be filled from the exterior of the housing 13 through plugged radial passages as at 70 and 71 respectively. The passage 70 leads directly into the slot 7 while the passage 71 leads into the branch line 21 (see also Fig. 5) to the grooved pump inlet port at 22. The cover plate 72 shown by Fig. 1 may be removed for convenient access to the plugs of the several openings on appropriate rotation of the housing 13.

During operation of the unit, pressures in the hydraulic circuit being higher than the atmospheric pressure in reservoir 34 will maintain the ball valves 66 and 69 seated. If any leakage occurs to deplete the oil supply in the circuit, the high pressure and low pressure sides will have created a vacuum by which the valves 66 and 69 are opened so as to permit oil in reservoir 34 (under atmospheric pressure) to flow into the circuit.

It will readily be seen from this description of the embodiment of the invention as illustrated that the previously mentioned objects and advantages are accomplished in a novel manner. The device disclosed will operate efficiently, and it should be further noted in this connection that in the provision for driving the housing or casing of the unit in the same direction as the rotor of the pump any frictional forces resulting from the rotor blades turning in the pump chamber will tend to turn the housing itself and thus contribute to the over-all operational efficiency of the device.

What is claimed is:

1. A variable speed hydraulic transmission comprising a rotatably driven outer housing member having axially aligned openings at opposite ends thereof, a drive shaft extending inwardly through one of said openings and on said shaft a pump rotor with radially urged sliding vanes, a stationary member extending inwardly through the other opening with the inner ends of said shaft and member in spaced relation and on said stationary member an inner member having radially urged sliding vanes for a motor member, said driven outer member having a motor chamber in eccentric relation to said vaned motor member and engaging said vanes and a pump chamber in which said vaned pump rotor is disposed, a cam ring in said latter chamber encasing the rotor and engaging the vanes thereof, said ring having a side wall portion and diametrically slidable keyed connection with said driven outer member, a closed hydraulic circuit in said latter member between said pump chamber and said motor chamber, and means supported by said stationary member and movable between the end of the latter and the end of the drive shaft to adjust said cam ring from a position of concentricity with said pump rotor to an eccentric position relative thereto.

2. A variable speed hydraulic transmission comprising a rotatably driven outer housing member having axially aligned openings at opposite ends thereof, a pump drive shaft journaled in one of said openings with a sliding vane pump rotor fixed on the inner end of said shaft and said driven housing defining a chamber in surrounding relation to said rotor, a flanged cam ring in said chamber encasing said rotor with said ring being slidably keyed to said housing for rotation therewith and slidable movement transversely of the rotor axis, said ring having an elongated central opening with a pair of opposite sides parallel to each other and to the slidable key connection, a stationary shaft journaled in the other of said aligned end openings with the inner end of the stationary shaft disposed in adjacent spaced relation to said cam ring opening, a rod movable longitudinally within said stationary shaft and extending from the inner end thereof, a bearing block journaled on the end of the rod with opposite sides of said block being formed with diagonal slots angled transversely of said rod axis and engaging the parallel sides of said cam ring opening for rotation of the block with the ring, a pair of slot engaging members extending radially from the ring into said bearing slots for cammed movement of said ring transversely of the rotor axis on longitudinal movement of said bearing block, said driven housing at its said other end forming a motor chamber, an inner sliding vane member fixed on said stationary shaft eccentrically within said motor chamber, said driven housing having an intermediate section dividing said pump and motor chambers through which said stationary shaft extends and providing on the pump side of said intermediate section a reservoir chamber, said housing exteriorly of said reservoir having a closed hydraulic circuit between said pump and motor chambers for driving the rotatable housing member by said pump, and a support for said stationary shaft, said rod extending outwardly through the support and having manual means for adjusting the longitudinal position of said bearing block relative to said cam ring to vary the eccentricity thereof.

3. A variable speed hydraulic transmission comprising a rotatably driven outer housing member with axially aligned openings and forming a pump chamber at one end and a motor chamber at the other end, a drive shaft extending through the first end and having a vaned pump rotor in said pump chamber, a flanged cam ring in said latter chamber rotatably driven by said rotatable housing and keyed thereto for slidable movement transversely of said rotor axis, said ring having an elongated opening axially of the rotor with opposite sides thereof parallel with said key connection to said housing, a stationary shaft fixed against rotation in the other end opening of the housing and extending through the motor chamber, a longitudinally slidable rod carried axially of said stationary shaft and extending therethrough with a bearing block journaled on its end and fitted in the opening of said cam ring with opposite sides of the block slidably receiving said parallel sides of the ring opening, a vaned inner motor member mounted on said stationary shaft and disposed in eccentric relation within the motor chamber, said rotatable housing having between said chambers a centrally chambered reservoir section and inlet and outlet passages around the reservoir forming a closed hydraulic circuit between the motor and pump chambers, said stationary shaft and rod extending outwardly of said housing and a fixed support for said stationary shaft with a threaded rod actuator receiving said rod end for rotation thereof and longitudinal movement of the rod and bearing block in said cam ring opening, said bearing block and cam ring having slidable interengaging means operable to cam said ring transversely of said rod axis.

4. The structure of claim 3 in which said reservoir is connected by passages with check valves to the high and low pressure sides of said hydraulic circuit, and the outer face of said pump rotor is recessed radially of its axis for extension of said bearing block inwardly of the cam ring, said cam ring opening and rotor recess communicating directly with and forming a portion of the reservoir of said reservoir section.

5. The structure of claim 3 in which said pump chamber end of said rotatable housing is formed with a peripheral portion overhanging the pump drive shaft outwardly of the axial end opening thereof and the low pressure side of the hydraulic circuit includes conduits to and from said overhang portion with a cooling tube connecting the latter being looped peripherally at said pump end of said housing.

6. The structure of claim 3 in which said pump section of the housing is journaled on said drive shaft with said motor and reservoir housing sections being journaled on said stationary shaft and an output drive pulley is fixed to the motor end section, all of said sections being separably formed portions of said rotatable housing and joined together in fixed relation, the said inlet and outlet passages of said pump and motor chambers including arcuately formed grooves in the end walls of said reservoir section, said cam ring having arcuately formed openings for registering with the grooves on the adjacent facing wall of the reservoir section.

7. A variable speed hydraulic transmission comprising a variable capacity hydraulic pump and an hydraulic motor, each having a cylindrical inner member with a plurality of radially extending elements slidable in said inner member, the pump inner member being rotatable and the motor inner member being stationary, a rotatable outer member enclosing said inner members of the pump and motor in axially aligned spaced relation and forming chambers for the same with closed circuit pressure and exhaust passages therebetween, the chamber in which said motor inner member is mounted being eccentrically related to the periphery of said inner member and the said radial elements thereof forming with the motor chamber wall expansible chambers between the same, said outer member having a pump cam ring, rotatable therewith and movable transversely of its axis, mounted in said pump chamber with the said radial elements of the pump inner member forming expansible chambers with said ring, a stationary support carrying said motor inner member in fixed relation and movable control means mounted in said support adjustably engaging said cam ring to impart transverse movement to the same and vary the eccentricity of said ring in said pump chamber, said ring having a side wall formed with inlet and outlet pump passages communicating with the exhaust and pressure passages, respectively, of said rotatable outer member.

8. A variable speed hydraulic transmission comprising a variable capacity hydraulic pump and a hydraulic motor with each having a cylindrical inner member with radially extending outwardly urged slidable vanes associated therewith, said inner members being in axially aligned spaced relation with said pump member being rotatable and said motor member being mounted in stationary fixed position, a rotatable outer driven member having a pump chamber encasing the said vaned member of the pump, a cylindrical motor chamber eccentrically encasing and engaging the vanes of said stationary inner member of the motor, and an intermediate portion having closed circuit pressure and exhaust passages between said chambers, and a cam ring in said pump chamber engaging the vanes of the pump inner member, said ring having a side wall rotatable with said outer member and slidable thereon transversely of the pump axis for varying the capacity of said pump, a driving member for rotating said pump inner member and a support for the fixed mounting of said stationary inner motor member, and adjustable control means carried by said stationary support being interconnected with said cam ring and movable to shift the axis of said ring with respect to said pump inner member, the said side wall of the ring having ports connecting the exhaust and pressure passages communicating with said pump chamber.

9. The structure of claim 8 in which the said driving member for the pump is a drive shaft; the stationary support for the motor inner member is a fixed shaft; said rotatable outer member is supported on bearings mounted on said drive shaft and said fixed shaft; and a power take-off is fixed at one end of said rotatable outer member.

References Cited in the file of this patent

UNITED STATES PATENTS 2,227,631    Carter _____ Jan. 7, 1941